United States Patent
Takagi

(10) Patent No.: US 7,643,730 B2
(45) Date of Patent: Jan. 5, 2010

(54) VIDEO RECORDER TO BE CONNECTED TO A DIGITAL VIDEO CAMCORDER VIA IEEE 1394 SERIAL BUS

(75) Inventor: Atsushi Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 827 days.

(21) Appl. No.: 11/259,033

(22) Filed: Oct. 27, 2005

(65) Prior Publication Data

US 2006/0088282 A1    Apr. 27, 2006

(30) Foreign Application Priority Data

Oct. 27, 2004   (JP)   ............................. 2004-312129

(51) Int. Cl.
  *H04N 7/26* (2006.01)
  *G11B 27/00* (2006.01)
(52) U.S. Cl. .............................. 386/124; 386/46; 386/57
(58) Field of Classification Search .................. 386/46, 386/52, 57, 123–126
  See application file for complete search history.

(56) References Cited

U.S. PATENT DOCUMENTS

| | | | | |
|---|---|---|---|---|
| 4,549,231 | A * | 10/1985 | Namiki | ........................ 386/57 |
| 6,088,304 | A | 7/2000 | Aramaki et al. | |
| 6,892,353 | B1 * | 5/2005 | Ubillos | ....................... 715/727 |
| 7,099,557 | B1 | 8/2006 | Morotomi et al. | |
| 2001/0031131 | A1 * | 10/2001 | Fukai et al. | .................... 386/52 |
| 2004/0246534 | A1 * | 12/2004 | Higuchi et al. | ............... 358/474 |

FOREIGN PATENT DOCUMENTS

| | | |
|---|---|---|
| JP | 05-054602 A | 3/1993 |
| JP | 06-338170 A | 12/1994 |
| JP | 10-106237 A | 4/1998 |
| JP | 2000-59731 A | 2/2000 |
| JP | 2001-67838 A | 3/2001 |
| JP | 2004-221884 A | 8/2004 |

OTHER PUBLICATIONS

Japanese Office Action dated May 11, 2007 including English translation (Four (4) pages).

* cited by examiner

*Primary Examiner*—Thai Tran
*Assistant Examiner*—Mishawn Dunn
(74) *Attorney, Agent, or Firm*—Crowell & Moring LLP

(57) ABSTRACT

A video recorder connected to a DV (Digital Video) camcorder via an IEEE serial bus comprises a memory for storing time codes in dubbing-unwanted information, commanded by a user, in a DV tape. When commanded by the user for video recording, a microprocessor of the video recorder controls the DV camcorder to fast forward the DV tape for data area other than the dubbing-unwanted information based on the time codes about the dubbing-unwanted information as stored in the memory, and to reproduce the video information in the dubbing-unwanted information. This makes it possible to significantly reduce the time required for the user to check the video information to be dubbed.

9 Claims, 4 Drawing Sheets

TIME CODE TABLE 60

| TIME CODE AT START POINT | TIME CODE AT END POINT |
|---|---|
| 0:40 | 0:45 |

MODIFIED TIME CODE TABLE 60

| TIME CODE AT START POINT | TIME CODE AT END POINT |
|---|---|
| 0:55 | 1:00 |

VIDEO RECORDER TO BE CONNECTED TO A DIGITAL VIDEO CAMCORDER VIA IEEE 1394 SERIAL BUS

BACKGROUND OF THE INVENTION

1. Field of the Invention

The present invention relates to a video recorder to be connected to a DV camcorder via an IEEE 1394 serial bus.

2. Description of the Related Art

It is known to connect a DV (Digital Video) camcorder via an IEEE (Institute of Electrical & Electronics Engineers) 1394 serial bus to a video recorder such as a DVD (Digital Versatile Disc) recorder or a hard disk drive recorder, and to dub stream data (photographed data), recorded on and reproduced from a DV (Digital Video) tape in the DV camcorder, onto a recording medium such as a DVD or a hard disk in the video recorder. The following describes an example of the dubbing process in the case where the video recorder is a DVD recorder.

First, a user connects a DV camcorder with a DV tape to a DVD recorder by an IEEE 1394 serial bus cable. Then, the user selects dubbing (recording) from a setting menu, and presses a decision key to start the dubbing process. In response to the operation of the user, the DVD recorder sends a reproduction start command to the DV camcorder via the IEEE 1394 serial bus, whereby the dubbing starts in which the DV camcorder starts reproducing the DV tape, while at the same time the DVD recorder starts recording. Thus, after connecting the DV camcorder to the DVD recorder via the IEEE 1394 serial bus, the user is not required to manually operate the DV camcorder to start reproduction, or manually operate the DVD recorder to start recording in synchronization with the start of the reproduction, thereby improving the convenience in handling in this respect.

Furthermore, a DVD recorder connected to a DV camcorder via an IEEE 1394 serial bus has an additional convenient function. More specifically, assume that video information (video data) recorded on the DV tape contains information which is unwanted or does not have to be dubbed (such information unwanted for dubbing being hereafter referred to as "dubbing-unwanted information" or simply as "unwanted information") such as commercial information. In such case, a user first commands the DV camcorder from the DVD recorder to reproduce the video information before starting dubbing, and then view and check the reproduced video information on a liquid crystal display of the DV camcorder so as to check or identify the unwanted information. The user then operates a remote control to command the DVD recorder to store a start point and an end point of the unwanted information, in which the start and end points of the unwanted information are to be used in subsequent dubbing to prevent the unwanted information from being dubbed. By commanding the DVD recorder connected to the DV camcorder to perform dubbing after the above process, it is possible to dub the video information on the DV tape automatically or semi-automatically excluding (removing) the unwanted information (such automatic or semi-automatic dubbing function being hereafter referred to as "unwanted information-excluded dubbing"), thereby dubbing the wanted or essential information in the video information.

As described above, the system formed by the video recorder (DVD recorder) and the DV camcorder connected to each other via an IEEE 1394 provides improved convenience in handling, and thus can significantly reduce laborious work of the user. However, the system still suffers inconvenience. Specifically, the user may be uncertain in the actual dubbing as to whether or not the unwanted information which the user itself has commanded is properly set, after the user has checked, identified and commanded it using the function of the "unwanted information-excluded dubbing" as described above.

This is because, even though the user itself thought that the user properly input a command to the video recorder to exclude e.g. commercial information, there is a possibility that the user may not have properly set the start point and the end point of the unwanted information, so that the video recorder may actually store data area, including but beyond the commercial information, as data area to be excluded in the actual dubbing. If so, by viewing the video images recorded by dubbing, the user will find data missing in parts of data area which should contain the essential information (mainly the parts before and after the commercial information), so that the user is required to do the dubbing again. If the recording medium (disc) in the video recorder is e.g. a DVD-R (Recordable) which is write-once type, such recording medium containing improper data becomes a waste.

This problem may be solved by reproducing, before actual dubbing, the video information to be dubbed (namely the essential video information other than the unwanted information which the user has input a command to exclude) so as to display, on the liquid crystal display, the reproduced information for checking by the user. However, this causes further inconvenience in that it takes a significantly long time to reproduce the video information other than the unwanted information, because the unwanted information such as commercial or news program which the user commands to exclude is usually short.

SUMMARY OF THE INVENTION

An object of the present invention is to provide such a video recorder to be connected to a DV camcorder via an IEEE 1394 serial bus that enables a user to view unwanted information commanded by the user itself in video information recorded on a DV tape so as to easily check whether the unwanted information is proper, before actual dubbing using the function of the "unwanted information-excluded dubbing", thereby making it possible to significantly reduce the time required for the user to check the video information to be dubbed.

According to the present invention, we provide a video recorder to be connected to a DV (Digital Video) camcorder via an IEEE (Institute of Electrical & Electronics Engineers) 1394 serial bus, the video recorder comprising: an IEEE 1394 interface for sending and receiving control commands and its response signal, and also sending and receiving stream data, to and from the DV camcorder; a video recording means for recording, on a recording medium, stream data received from the DV camcorder via the IEEE 1394 interface; an operation means for entering various inputs to command and operate the DV camcorder and the video recorder, including input to command dubbing-unwanted information in the stream data in the DV tape in the DV camcorder, and further including input to command recording by the video recording means; a dubbing-unwanted information storage means for storing time codes in the dubbing-unwanted information in the stream data (DV tape) commanded by a user using the operation means; and a dubbing-unwanted information reproduction control means which based on the time codes about the dubbing-unwanted information stored in the dubbing-unwanted information storage means, controls the DV camcorder to fast forward the DV tape in the DV camcorder for data area(s) other than the dubbing-unwanted information, and to reproduce the video information in the dubbing-unwanted information, when the user using the operation means commands the recording by the video recording means.

The video recorder according to the present invention, which is to be connected to the DV camcorder via the IEEE 1394 serial bus, enables a user to view the dubbing-unwanted information commanded by the user itself in the video information recorded on the DV tape so as to easily check whether the unwanted information is proper, before actual dubbing using the function of dubbing the video information excluding the dubbing-unwanted information, thereby making it possible to significantly reduce the time required for the user to check the video information to be dubbed.

Preferably, when the user, using the operation means, commands the recording by the video recording means, the dubbing-unwanted information reproduction control means controls the DV camcorder to rewind the DV tape, and to fast forward the DV tape for the data area(s) other than the dubbing-unwanted information after the end of the rewinding, and further to reproduce the video information in the dubbing-unwanted information.

Further preferably, the video recorder further comprises a zero reset information storage means for storing information about zero reset of time codes in the stream data during the rewinding of the DV tape, wherein the dubbing-unwanted information reproduction control means determines the dubbing-unwanted information based on the time codes about the dubbing-unwanted information stored in the dubbing-unwanted information storage means, and on the information about the zero reset stored in the zero reset information storage means. The video recorder according to this further preferred mode can command the DV camcorder to properly pick up and reproduce the video information in the dubbing-unwanted information commanded by the user in advance, even if the DV tape in the DV camcorder is a DV tape containing a time code(s) reset to zero.

The video recorder can be designed so that the information about the zero reset stored in the zero reset information storage means is each time code in data in the stream data (DV tape) immediately before data with a time code reset to zero.

Further, the video recorder can be designed so that the information about the zero reset stored in the zero reset information storage means is number of times, counted by the dubbing-unwanted information reproduction control means, when a video head of the DV camcorder passes each data area recording a time code reset to zero.

Furthermore, the video recorder can be designed so that the video information in the dubbing-unwanted information in the stream data (DV tape) is displayed on a display means of the DV camcorder.

Still further, the video recorder can be a DVD (Digital Versatile Disc) recorder.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

Each of FIG. 2

DESCRIPTION OF THE PREFERRED EMBODIMENTS

Embodiments of the present invention, as best mode for carrying out the invention, will be described hereinafter with reference to the drawings. The present invention relates to a video recorder to be connected to a DV (Digital Video) camcorder via an IEEE 1394 serial bus. The following embodiments describe examples in which the present invention is applied to a DVD (Digital Versatile Disc) recorder. It is to be understood that the embodiments described herein are not intended as limiting, or encompassing the entire scope of, the invention.

Figure 1:
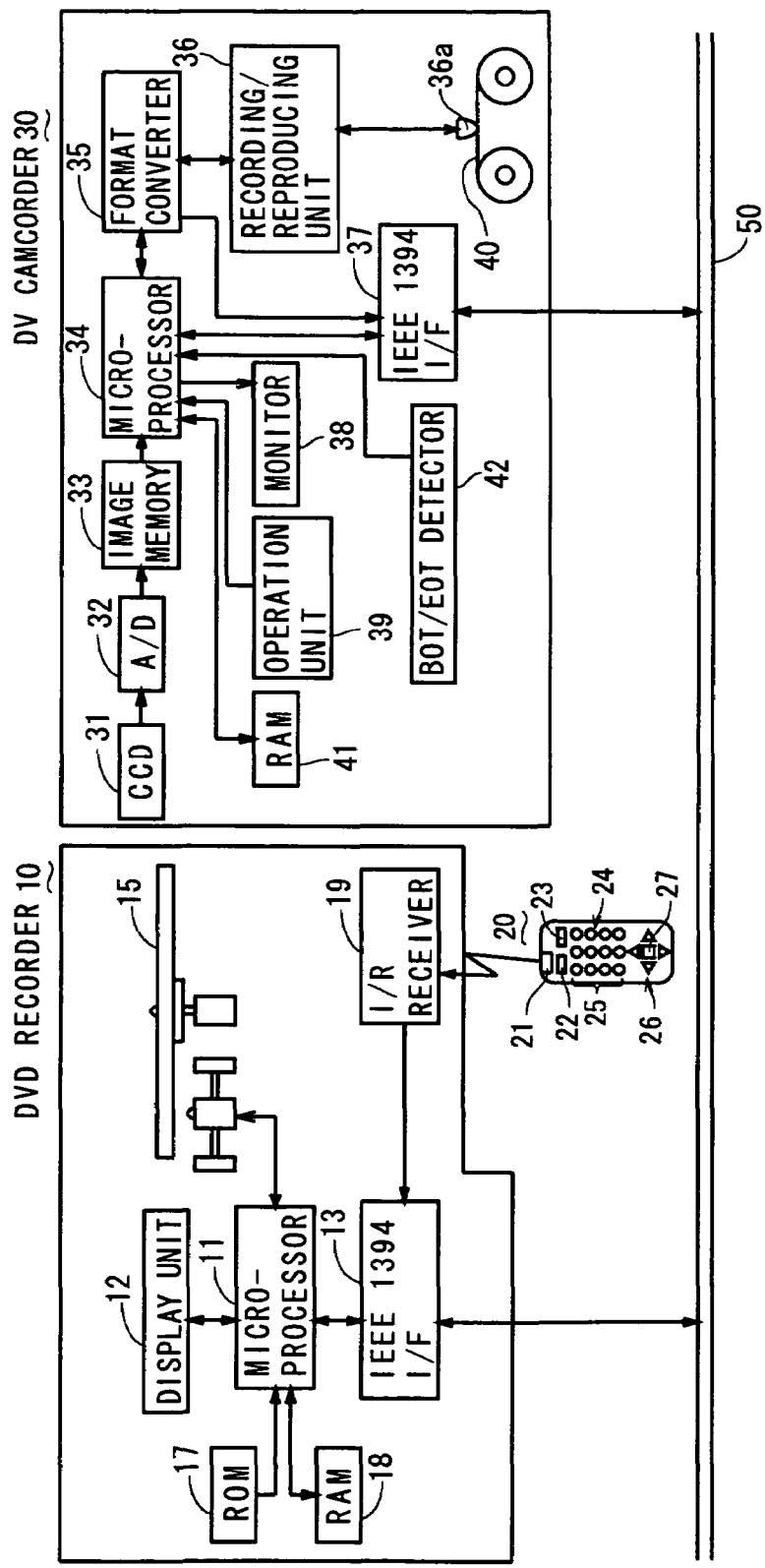
FIG. 1 is a schematic electrical block diagram of a DVD recorder according to an embodiment of the present invention as well as a DV camcorder to be connected to the DVD recorder via an IEEE 1394 serial bus.

FIG. 1 shows a schematic electrical block diagram of a DVD recorder 10 according to an embodiment of the present invention as well as a DV camcorder 30 to be connected to the DVD recorder 10 via an IEEE 1394 serial bus 50. The DVD recorder 10 is connected to the DV camcorder 30 via the IEEE 1394 serial bus 50 (hereafter referred to simply as "bus"), and can record stream data (photographed data), received from the DV camcorder 30, on a DVD 15 mounted in the DVD recorder 10. The DVD recorder 10 comprises a microprocessor 11 for controlling various elements and units therein. The microprocessor 11 serves as claimed "dubbing-unwanted information reproduction control means" for controlling the DV camcorder 30 to fast forward a DV tape 40 in the DV camcorder 30 for data area(s) other than the unwanted information, and to reproduce the video information in the unwanted information as will be described later. The microprocessor 11 further determines the unwanted information based on time codes about the unwanted information stored in a RAM 18, and on information about zero reset stored in the RAM 18 as will be described later.

The DVD recorder 10 further comprises: an IEEE 1394 interface 13 (hereafter referred to as "IEEE 1394 I/F"); a display unit 12 for displaying various messages; a RAM (Random Access Memory) 18 connected to the microprocessor 11; and a ROM (Read Only Memory) 17 also connected to the microprocessor 11. The IEEE 1394 I/F 13 is provided for sending and receiving data, such as control commands and stream data, to and from an external input/output device such as the DV camcorder 30 via the bus 50. The RAM 18 is provided for storing information such as time codes contained in data (in stream data) corresponding to a recording position and a reproduction position in a DV tape 40 in the DV camcorder 30.

The RAM 18 serves as claimed "dubbing-unwanted information storage means" for storing time codes about the unwanted information in the stream data (DV tape 40) commanded by a user using a remote control 20, and further serves as claimed "zero reset information storage means" for storing information about zero reset of time codes in the stream data (DV tape 40) during the rewinding of the DV tape 40, as will be described later. Here, the terms "recording position" and "reproduction position" are used in the present specification to mean positions in the DV tape 40, respectively, at which a video head 36a is positioned during recording and reproduction, respectively. The ROM 17 is provided for storing a program for performing the function of the "unwanted information-excluded dubbing" as well as a program according to the present invention for extracting (picking up) and reproducing unwanted information before dubbing.

Furthermore, the DVD recorder 10 comprises an infrared signal receiving unit (I/R receiver) 19 for receiving an infrared signal sent from a remote control 20 (claimed "operation means"). The remote control 20, which a user uses to command and operate the DVD recorder 10 and the DV camcorder 30, has an infrared signal sending unit 21 and a key portion 24 having various keys. The keys of the key portion 24 include a power supply key 23, numeric input keys 25, cursor keys 26, a decision key 27, and additionally, a menu key 22 to command the microprocessor 11 to display, on a display unit (not shown), various menus including a menu to command dubbing from the DV tape 40 in the DV camcorder 30 to the DVD 15 in the DVD recorder 10.

On the other hand, the DV camcorder 30 is a DV (Digital Video) camera with a built-in VCR (Video Cassette Recorder), and comprises: an IEEE 1394 interface 37 (hereafter referred to as "IEEE 1394 I/F") for sending and receiving control commands and stream data to and from e.g. the DVD recorder 10 via the bus 50; a CCD (Charge Coupled Device) 31 for outputting an image of a photographed object in the form of analog signal; an A/D (Analog-to-Digital) converter 32 for converting an analog signal output from the CCD 31 to a digital signal; an image memory 33 for temporarily storing image data sent from the A/D converter 32; a microprocessor 34 for subjecting the image data stored in the image memory 33 to various image processing; a format conversion circuit (format converter) 35; and a recording/reproducing unit 36. The format conversion circuit 35 converts, into stream data, the format of the image data, subjected to the image processing by the microprocessor 34. Using a video head 36a, the recording/reproducing unit 36 writes or records stream data, output from the format conversion circuit 35, onto the DV tape 40, and reproduces stream data (photographed data) recorded on the DV tape 40, and so on. The DV camcorder 30 further comprises: a liquid crystal monitor (monitor) 38 (claimed "display means") for displaying images sent from the microprocessor 34; an operation unit 39; a RAM 41 for storing various data; and a BOT (beginning-of-tape)/EOT (end-of-tape) detection sensor (BOT/EOT detector) 42 for detecting beginning and end of the DV tape 40.

Figure 2:
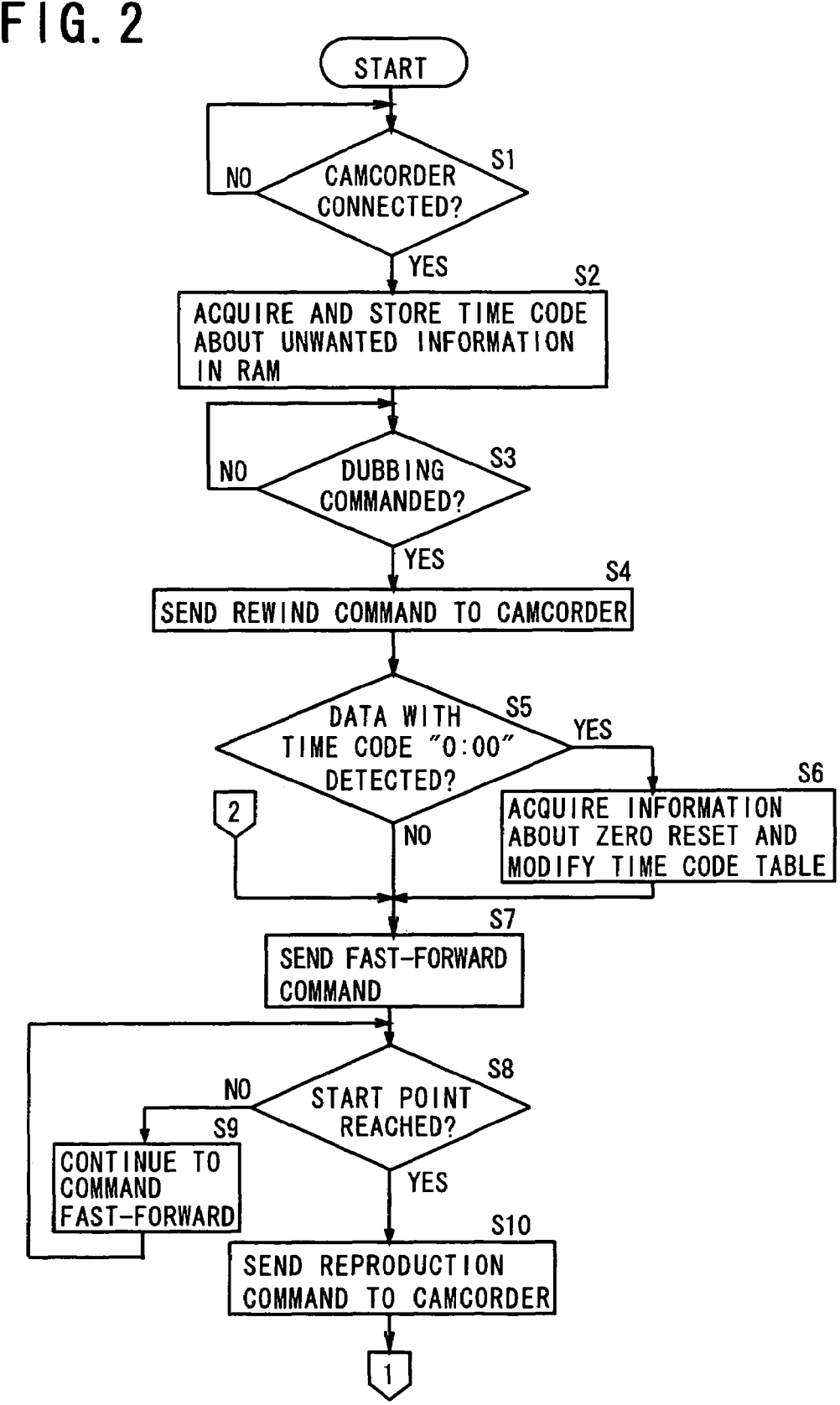
Figure 3:
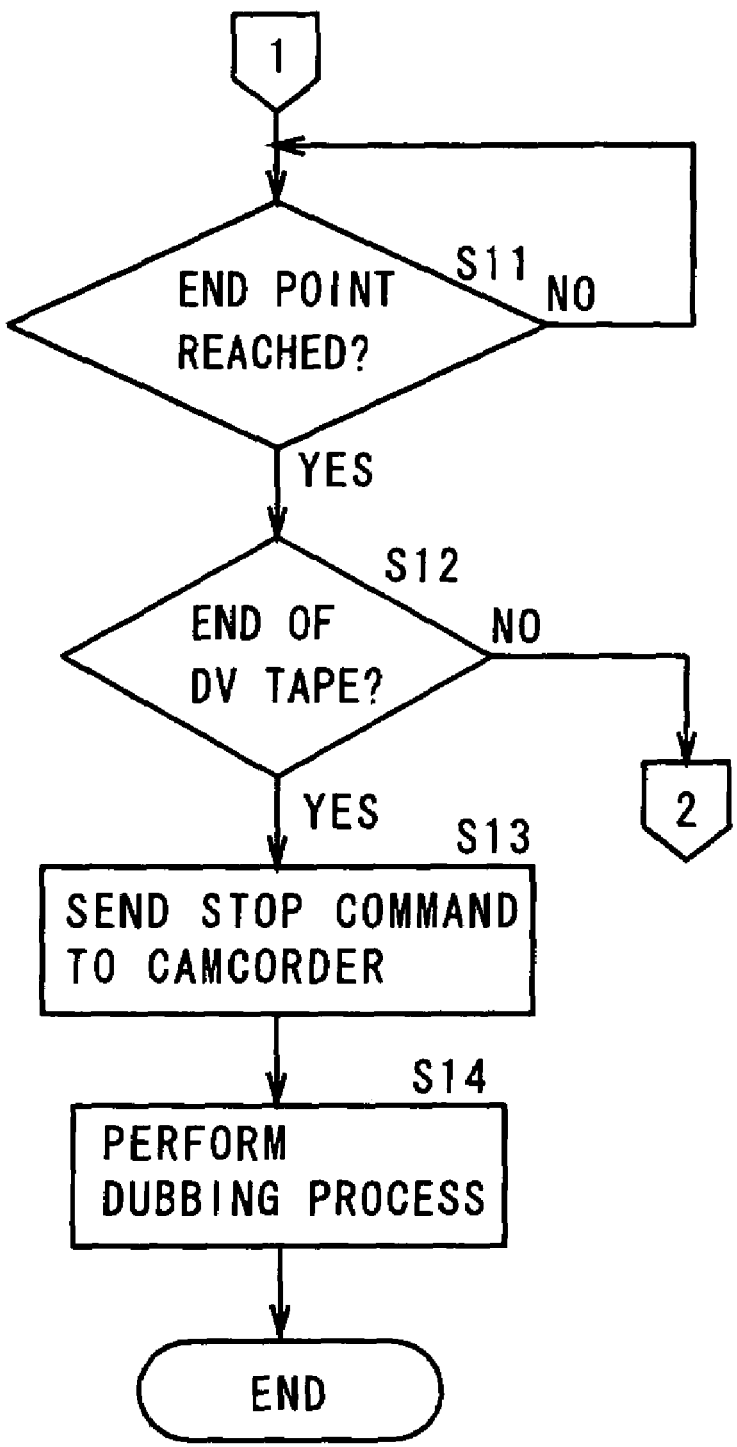
FIG. 3 is a flow chart showing a process of "unwanted information-excluded dubbing" in the DVD recorder.

Referring now to the flow charts of FIG. 2 and FIG. 3, the following describes a process of "unwanted information-excluded dubbing" in the DVD recorder 10 for dubbing from the DV tape 40 to the DVD 15 mounted in the DVD recorder 10. First, the microprocessor 11 of the DVD recorder 10 detects that the DV camcorder 30 is connected to the DVD recorder 10 via the bus 50 (YES in S1). Thereafter, when a user, using the remote control 20, inputs a command for unwanted information to the DVD recorder 10, the microprocessor 11 acquires a time code at a start point and a time code at an end point of the unwanted information, and stores the two time codes in a predetermined area in the RAM 18 (S2). This will be described in detail below.

When the user operates the remote control 20 to select the function of "unwanted information-excluded dubbing" in the present embodiment, the DVD recorder 10 is put into an "unwanted information-excluded dubbing" mode. In this "unwanted information-excluded dubbing" mode, the user operates the remote control 20 to command normal reproduction or fast-forward reproduction of the DV tape 40 so as to search for unwanted information (e.g. commercial information) in the reproduced video information. Thus, the user can view and check the reproduced video information on the liquid crystal monitor 38 of the DV camcorder 30.

When the user checks the unwanted information, the user commands a start point and an end point of the unwanted information by operating a certain key (not shown) on the remote control 20 provided with the function of this command, or by operating a further certain key (e.g. decision key 27) if the further certain key is provided with the function of this command as the DVD recorder 10 is put into the "unwanted information-excluded dubbing" mode. More specifically, the user operates the certain key or the further certain key to enter an input each time at the start point and the end point of the unwanted information. Thereby, the microprocessor 11 of the DVD recorder 10 acquires each time code from each stream data receiving from the DV camcorder 30 at each time when the user operates the certain key or the further certain key of the remote control 20 to enter each input. The microprocessor 11 stores the thus acquired time codes in the form of a table in the RAM 18.

Figures 4, 5, 6:
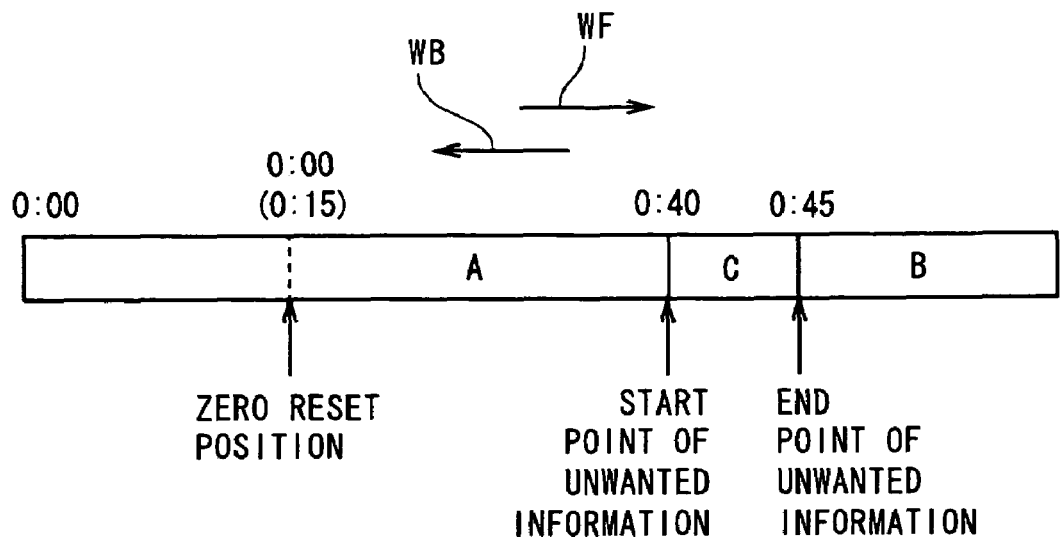
FIG. 4 is a chart showing an example of stream data of video information recorded on a DV tape in the DV camcorder.
FIG. 5 is an example of a time code table stored in a RAM of the DVD recorder.
FIG. 6 is an example of a modified time code table stored in the RAM of the DVD recorder.

This will be described in detail below with reference to FIG. 4 and FIG. 5. FIG. 4 is a chart showing an example of stream data of video information recorded on the DV tape 40. The stream data of FIG. 4 has a television program part A, a commercial part C and a television program part B recorded in this order. For selecting the commercial part C as unwanted information, the user first operates the remote control 20 at the start point of the commercial part C. Thereby, the microprocessor 11 of the DVD recorder 10 acquires a time code "0:40", which is a time code in data corresponding to the start point of the commercial part C. Similarly, the user operates the remote control 20 at the end point of the commercial part C, whereby the microprocessor 11 acquires a time code "0:45", which is a time code in data corresponding to the end point of the commercial part C.

The microprocessor 11 then stores the time code at the start point and the time code at the end point of the unwanted information (commercial part C) in a predetermined area of the RAM 18 in the format of a time table 60 as shown in FIG. 5. This also applies to the case where the user selects two or more unwanted information (e.g. two or more commercial parts). Note that in the specific example shown in FIG. 4, the time code is reset to 0 (zero reset) at a position 15 minutes after the beginning of the stream data (beginning of the DV tape 40) (i.e. at a position of a time code "0:15"). The zero reset occurs when the DV camcorder 30 is operated to change the recording mode from standard mode to 3× fast-forward mode, or when the DV tape 40 is once taken out of the DV camcorder 30, or in other operations. It may be required to modify the time code table 60 in the case where the stream data contains a time code reset to 0. An example of a process of modifying the time code table 60 will be described later.

Referring back to the flow chart of FIG. 2, when the user operates the remote control 20 to command dubbing (YES in S3) after the time code table 60 is created in the RAM 18 of the DVD recorder 10 as described above, the microprocessor 11 of the DVD recorder 10 sends a rewind command to the DV camcorder 30 to rewind the DV tape 40 (S4). The DV camcorder 30 receives the rewind command and starts rewinding the DV tape 40 (in the direction of arrow WB shown in FIG. 4). Note that the reproduction position of the DV tape 40 (the position of the DV tape 40 facing the video head 36a) at the time of starting the rewind stays at the position where the user has commanded the end point of the unwanted information (i.e. the position of the time code "0:45" shown in FIG. 4). Accordingly, the rewinding causes the DV tape 40 to be rewound back to the beginning of the stream data (beginning of the DV tape 40) through the positions of the time codes "0:45" and "0:40" and the zero reset position, thereby ending the rewinding. When the microprocessor 11 of the DVD recorder 10 detects data with a time code reset to 0 (zero) (data with a time code "0:00") in the DV tape 40 while the DV tape 40 is rewound (YES in S5), the microprocessor 11 acquires information about the zero reset and modifies the time code table 60 (S6). Thereafter, the microprocessor 11 sends a fast-forward command to the DV camcorder 30.

The process shown in the step S6 will be more specifically described below with reference to FIG. 4. In the case of the example shown in FIG. 4, the video head 36a of the DV camcorder 30 passes the data area recording the zero reset time code (i.e. data area recording a time code reset to zero) in the DV tape 40 while the DV tape 40 is rewound. Thus, the microprocessor 11 of the DVD recorder 10 acquires a time code (time code "0:15" in the example shown in FIG. 4) at a position immediately after the video head 36a passes the data area recording the zero reset time code, which is a position immediately before the data area recording the zero reset time code as seen from the beginning of the stream data (beginning of the DV tape 40). Then, the microprocessor 11 stores the thus acquired time code in the RAM 18 as information about the zero reset.

Based on the information about the zero reset as stored in the RAM 18, the microprocessor 11 modifies the time code table 60 in the following manner. Specifically, the microprocessor 11 adds, to the value of each time code in the time code table 60, the value of the time code at a position immediately after the video head 36a passes the data area recording the zero reset time code. Since the value of the time code, at a position immediately after the video head 36a passes the data area recording the zero reset time code, is "0:15" in the example shown in FIG. 4, the microprocessor 11 adds this value of "0:15" to the time code at the start point and the time code at the end point of the unwanted information (commercial part C) as shown in FIG. 5. Thereby, the time code table 60 is modified to that shown in FIG. 6, in which the time code at the start point of the unwanted information is "0:55", while the time code at the end point of the unwanted information is "1:00". Note here that if the stream data has two or more data, each with a reset time code, in data area between the beginning of the stream data (beginning of the DV tape 40) and the start point of the unwanted information commanded by the user, the microprocessor 11 adds, to the value of each time code in the time code table 60, all the values of the time codes each at a position immediately after the video head 36a passes the each data area recording the each zero reset time code.

Referring back again to the flow chart of FIG. 2, the microprocessor 34 of the DV camcorder 30 receives the fast-forward command sent in the step S7, and fast forwards the DV tape 40 (in the direction of arrow WF shown in FIG. 4) in response to the thus received command. While the start point of the unwanted information is not reached (NO in S8), the microprocessor 11 of the DVD recorder 10 continues to command the fast-forward (S9). When the start point of the unwanted information is reached (YES in S8), the microprocessor 11 sends a reproduction command to the DV camcorder 30 (S10).

In order to determine whether the unwanted information is reached, the microprocessor 11 compares and determines whether each time code in each data acquired by the DVD recorder 10 (received from the DV camcorder 30) is the same as the time code at the start point of the unwanted information in the modified time code table 60. This is provided that the data of the each time code acquired by the DVD recorder 10 is in the data area between the beginning of the stream data (beginning of the DV tape 40) and the zero reset position (zero reset time code). When the each time code acquired by the DVD recorder 10 is in the data area beyond the zero reset position, the microprocessor 11 of the DVD recorder 10 compares the time code at the start point of the unwanted information in the modified time code table 60 with a sum of the value of the each time code acquired by the DVD recorder 10 plus the value of the time between the beginning of the stream data (beginning of the DV tape 40) and the zero reset position.

This will be described more specifically below, using the example of FIG. 4. When the fast-forward operation (in the direction of arrow WF) starts in response to the fast-forward command sent in the step S7, the values of time codes which the DVD recorder 10 sequentially receives or acquires in real time increment from "0:00" at the beginning of the stream data (beginning of the DV tape 40). However, from the zero reset position, the time code starts from "0:00" again. Thus, in the data area beyond the zero reset position, the microprocessor 11 uses the sum value of each time code in such data area plus the time (15 minutes) between the beginning of the stream data (DV tape 40) and the zero reset position for the purpose of comparison with the time code at the start point of the unwanted information as stored in the actual time code table 60. Note here that, as a matter of course, if the stream data has two or more zero reset positions in data area between the beginning of the stream data (beginning of the DV tape 40) and the start point of the unwanted information, the microprocessor 11 uses the sum value of each time code in such area plus all the values of the time codes each at a position immediately before each zero reset position for the purpose of comparison with the time code at the start point of the unwanted information as stored in the time code table 60.

Referring now to the flow chart of FIG. 3, a latter part of the process of the "unwanted information-excluded dubbing" performed by the DVD recorder 10 will be described. In response to the reproduction command sent to the DV camcorder 30 in the step S10, the camcorder 30 reproduces the DV tape 40. The microprocessor 11 of the DVD recorder 10 receives, from the DV camcorder 30, sequentially incrementing time codes from the DV camcorder 30, which are contained in sequentially positioned data in the stream data recorded on the DV tape 40.

When the end point of the unwanted information is reached, namely when the time code received from the DV camcorder 30 indicates that the reproduction position has reached the end point of the unwanted information (more specifically, when the microprocessor 11 determines that the then received time code is the same as the time code at the end point of the unwanted information as stored in the time code table 60) (YES in S11), the microprocessor 11 of the DVD recorder 10 determines whether the then reproduction position in the DV tape 40 is the end of the DV tape 40. If it is the end (YES in S12), the microprocessor 11 sends a stop command to the DV camcorder 30 (S13) to stop the DV camcorder 30, while if it is not the end (NO in S12), the microprocessor 11 sends a fast-forward command to the DV camcorder 30 by going back to the step S7 again so as to fast forward the DV tape 40 in the DV camcorder 30. After the above described process of reproducing the unwanted information for the viewing and checking by the user, the microprocessor 11 sends a rewind command to the DV camcorder 30 to rewind the DV tape 40, and performs actual dubbing in response to a separate command from the user (S14). Alternatively, the microprocessor 11 can be designed so that it performs the actual dubbing automatically, not in response to a command from the user, after the process of reproducing the unwanted information.

As described in the foregoing, the DVD recorder 10 according to the present embodiment reproduces the unwanted information in the DV tape 40. The user can view and check the reproduced video information of the unwanted information on the liquid crystal monitor 38 of the DV camcorder 30, so that the user can check whether the unwanted information commanded by the user itself is proper, before actual dubbing using the function of the "unwanted information-excluded dubbing". This easily enables dubbing which the user wishes or intends. Furthermore, the unwanted information (e.g. commercial information) is the information which the user views and checks before the actual dubbing using the function of the "unwanted information-excluded dubbing", so that the user can check in a short time whether the unwanted information commanded by the user itself is proper.

It is to be noted that the present invention is not limited to the above-described embodiments, and various modifications are possible. For example, in the above embodiment, the start point and the end point of the unwanted information are detected in the manner: that the microprocessor 11 of the DVD recorder 10 acquires a time code immediately after the zero reset position as zero reset information (information about zero reset) in the step S6, and adds the value of the thus acquired time code to the time code at the start point and the end point of the unwanted information so as to modify the time code table 60; and that using such time codes as values for comparison, the start point and the end point of the unwanted information are detected during the fast-forward of the DV tape 40 at a later stage. However, the DVD recorder 10 can be designed so that the microprocessor 11 of the DVD recorder 10 counts and stores, as zero reset information in the RAM 18, the number of times when the video head 36a of the DV camcorder 30 passes each data area recording the zero reset time code (such times being hereafter referred to as "zero reset position-passing times") in the DV tape 40 while the DV tape 40 is rewound, and that based on the thus stored number of zero reset position-passing times, the start point and the end point of the unwanted information are detected during the fast-forward of the DV tape 40 at a later stage.

This will be described more specifically below with reference to the example shown in FIG. 4. Now assume that the DV camcorder 30 is in the process of rewinding the DV tape 40 (in the direction of arrow WB shown in FIG. 4) in response to the rewind command from the DVD recorder 10 in the step S6 of FIG. 2. Further assume that the video head 36a of the DV camcorder 30 has passed a zero reset position once until it reaches the beginning of the stream data (beginning of the DV tape 40). Under these assumptions, the microprocessor 11 of the DVD recorder 10 detects the passing of the video head 36a through the zero reset position on the basis of time codes, which the microprocessor 11 acquires. The microprocessor 11 then stores the number of zero reset position-passing times (the number being one here) in a predetermined area (counter) in the RAM 18.

Thereafter, when the DV tape 40 is fast forwarded through the step S7, the microprocessor 11 of the DVD recorder 10 detects the passing of the video head 36a through zero reset positions, but goes without detecting an unwanted information until the detected number of zero position-passing times becomes equal to the number of zero reset position-passing times (the number being one here in the example of FIG. 4) stored in the predetermined area (counter) in the RAM 18. After the detected number of zero position-passing times becomes equal to the number of zero reset position-passing times stored in the predetermined area (counter), the microprocessor 11 detects an unwanted information, namely compares time codes acquired by the microprocessor 11 (received from the DV camcorder 30) in real time with the time codes at the start point and the end point of the unwanted information as stored in the time code table 60. In the case of this example, the microprocessor 11 omits the process of modifying the time code table 60 created in the step S2.

Both of the above-mentioned methods of detecting the unwanted information enables the DV camcorder 30 to properly pick up and reproduce the video information in the dubbing-unwanted information commanded by the user in advance, even if the DV tape 40 in the DV camcorder 30 is a DV tape containing a time code(s) reset to zero.

In addition, although the DVD recorder 10 is exemplified in the above embodiment as a video recorder to be connected to the DV camcorder 30 via the bus 50, it is evident that instead of the DVD recorder 10, other video recorders can be used similarly, such as a hard disk recorder using a hard disk as a recording medium.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2004-312129 filed Oct. 27, 2004, the contents of which are hereby incorporated by reference.

What is claimed is:

1. A video recorder to be connected to a DV (Digital Video) camcorder via an IEEE (Institute of Electrical & Electronics Engineers) 1394 serial bus, the video recorder comprising:
   an IEEE 1394 interface for sending and receiving control commands and its response signal, and also sending and receiving stream data, to and from the DV camcorder;
   a video recording means for recording, on a recording medium, stream data received from the DV camcorder via the IEEE 1394 interface;
   an operation means for entering various inputs to command and operate the DV camcorder and the video recorder, including input to command dubbing-unwanted information in the stream data in the DV tape in the DV camcorder, and further including input to command recording by the video recording means;
   a dubbing-unwanted information storage means for storing time codes about the dubbing-unwanted information in the stream data (DV tape) commanded by a user using the operation means;
   a dubbing-unwanted information reproduction control means which based on the time codes about the dubbing-unwanted information stored in the dubbing-unwanted information storage means, controls the DV camcorder to fast forward the DV tape in the DV camcorder for data area(s) other than the dubbing-unwanted information, and to reproduce the video information in the dubbing-unwanted information, when the user using the operation means commands the recording by the video recording means;
   a zero reset information storage means for storing information about zero reset of time codes in the stream data during the rewinding of the DV tape;

wherein when the user, using the operation means, commands the recording by the video recording means, the dubbing-unwanted information reproduction control means controls the DV camcorder to rewind the DV tape, and to fast forward the DV tape for the data area(s) other than the dubbing-unwanted information after the end of the rewinding, and further to reproduce the video information in the dubbing-unwanted information; and wherein the dubbing-unwanted information reproduction control means determines the dubbing-unwanted information based on the time codes about the dubbing-unwanted information stored in the dubbing-unwanted information storage means, and on the information about the zero reset stored in the zero reset information storage means.

2. The video recorder according to claim 1,
wherein the information about the zero reset stored in the zero reset information storage means is each time code in data in the stream data (DV tape) immediately before data with a time code reset to zero.

3. The video recorder according to claim 2,
wherein the video information in the dubbing-unwanted information in the stream data (DV tape) is displayed on a display means of the DV camcorder.

4. The video recorder according to claim 2,
which is a DVD (Digital Versatile Disc) recorder.

5. The video recorder according to claim 1,
wherein the information about the zero reset stored in the zero reset information storage means is number of times, counted by the dubbing-unwanted information reproduction control means, when a video head of the DV camcorder passes each data area recording a time code reset to zero.

6. The video recorder according to claim 3,
wherein the video information in the dubbing-unwanted information in the stream data (DV tape) is displayed on a display means of the DV camcorder.

7. The video recorder according to claim 3,
which is a DVD (Digital Versatile Disc) recorder.

8. The video recorder according to claim 1,
wherein the video information in the dubbing-unwanted information in the stream data (DV tape) is displayed on a display means of the DV camcorder.

9. The video recorder according to claim 1, which is a DVD (Digital Versatile Disc) recorder.

* * * * *

UNITED STATES PATENT AND TRADEMARK OFFICE
CERTIFICATE OF CORRECTION

PATENT NO. : 7,643,730 B2
APPLICATION NO. : 11/259033
DATED : January 5, 2010
INVENTOR(S) : Atsushi Takagi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1105 days.

Signed and Sealed this

Twenty-first Day of December, 2010

David J. Kappos
*Director of the United States Patent and Trademark Office*